United States Patent [19]

Thomas et al.

[11] Patent Number: 4,724,524

[45] Date of Patent: Feb. 9, 1988

[54] VIBRATION-SENSING TOOL BREAK AND TOUCH DETECTOR OPTIMIZED FOR MACHINING CONDITIONS

[75] Inventors: Charles E. Thomas, Scotia; Minyoung Lee, Schenectady; James F. Bedard, Schenectady; Steven R. Hayashi, Schenectady; Lawson P. Harris, Scotia, all of N.Y.

[73] Assignee: General Elec. Co., Schenectady, N.Y.

[21] Appl. No.: 744,083

[22] Filed: Jun. 12, 1985

[51] Int. Cl.⁴ .................... G06F 15/46; G08B 23/00
[52] U.S. Cl. ..................... 364/474; 364/508;
364/148; 364/157; 73/104; 73/660; 340/680
[58] Field of Search ............... 364/167, 170, 474, 475, 364/508, 157, 148; 318/572; 73/104, 587, 660; 340/680

[56] References Cited

U.S. PATENT DOCUMENTS

| 3,793,627 | 2/1974 | Darrel et al. | 340/267 |
|---|---|---|---|
| 4,023,044 | 5/1977 | Miller et al. | 364/475 |
| 4,220,995 | 9/1980 | Shoda | 73/104 |
| 4,332,161 | 6/1982 | Kakino | 73/104 |
| 4,428,055 | 1/1984 | Kelley et al. | 364/474 |
| 4,471,444 | 9/1984 | Yee et al. | 73/104 |
| 4,514,797 | 4/1985 | Begin | 364/148 |
| 4,547,847 | 10/1985 | Olig et al. | 364/148 |
| 4,554,495 | 11/1985 | Davis | 318/572 |
| 4,559,600 | 12/1985 | Rao | 73/104 |
| 4,562,392 | 12/1985 | Davis et al. | 318/572 |
| 4,563,897 | 1/1986 | Moore | 73/587 |
| 4,574,633 | 3/1986 | Ohnuki et al. | 364/474 |
| 4,584,649 | 4/1986 | Komanduri et al. | 364/475 |
| 4,631,683 | 12/1986 | Thomas et al. | 364/474 |
| 4,636,779 | 1/1987 | Thomas et al. | 340/680 |
| 4,636,780 | 1/1987 | Thomas et al. | 340/680 |

OTHER PUBLICATIONS

"Sensing and Automation for Turning Tools", Powell et al., MS84-909, Sensor Technology for Untend Manufacturing, Chicago, 4/84.

*Primary Examiner*—Jerry Smith
*Assistant Examiner*—John R. Lastova

[57] ABSTRACT

A Machine Tool Monitor detects significant cutting tool breakage and the first contact of an advancing tool to a workpiece, and does this by monitoring vibration signals produced by the machining of parts and interpreting patterns in these signals. Information from the part program improves the performance of the detector and optimizes it for the cutting conditions called for by the machine tool control. The analog channel gain of the monitor is adjusted and parameters controlling the digital pattern recognition logic are selected using part program information on machining parameters. The tool touch or tool break detection mode is selected by the part program.

3 Claims, 9 Drawing Figures

TOOL TOUCH ACOUSTIC SIGNATURE

TOOL BREAK ACOUSTIC SIGNATURE - TYPE I

ANALOG CHANNEL OUTPUT SIGNAL

TOOL BREAK ACOUSTIC SIGNATURE - TYPE 2

TOOL BREAK ACOUSTIC SIGNATURE - TYPE 3

ROUGH SURFACE, INTERMITTENT CUTTING SIGNAL DOES NOT GENERATE BREAK ALARM

VIBRATION-SENSING TOOL BREAK AND TOUCH DETECTOR OPTIMIZED FOR MACHINING CONDITIONS

BACKGROUND OF THE INVENTION

The Government has rights to this invention pursuant to Contract No. F33657-83-C-2065 awarded by the Air Force.

This invention relates to a system and method to automatically optimize an acoustic tool break and tool touch detector to varying cutting conditions based upon information in the machine tool control.

The Machine Tool Monitor is a device which monitors vibration signals produced by the machining of metal parts and interprets patterns in these vibration signals to detect events of significance in the control of the machining process. It has two operating modes. In the tool break detection mode it detects cutting tool insert breaks; in the tool touch detection mode it detects the first contact of an advancing tool with the rotating workpiece.

One of the biggest problems in the development of a successful monitor is the very great range of variation of tool break and background noise signal characteristics that are encountered. The signal level at which an acoustic machining tool monitor has to work varies over a wide range. Even after a specific acoustic sensor is mounted in a specific location on a given machine tool, the signal can still vary over a range, in the order of 60 dB, due to variations in cutting conditions. This range of variation is enough to present problems of electrical noise contamination to low level signals, saturation of electronic noise circuitry on high level signals, and difficulties with any fixed thresholds used by tool monitoring algorithms. However, experience has shown that signal level versus time in a cut will usually vary in repeated operations of the same cut by a factor of less than 2 to 1. A few cuts will contain a wide range from maximum to minimum signal level during the cut, but this is not usually the case. It is desirable, for best tool break detection performance, to adjust the gain of the signal channel so that the maximum normal cutting signal level during the cut is about 20 to 30 percent of the channel saturation level. This leaves sufficient room for detecting abnormally high signals due to the breaks, and avoids extremely low signal levels during the lower signal portions of the cut. It is desirable to be able to make the cut-to-cut gain adjustments without having to establish proper gain settings by prior tests of each cut. Additionally, the vibration signal generated in the tool touch detection mode is lower than in the tool break detection mode and higher gain is required.

There are other tool monitoring system parameters whose optimum value may change from cut to cut. It is useful to avoid tool break alarms on spindle rpm-related periodic signal disturbances. Parameters designed for this function may need to be adjusted for cut-to-cut variations in minimum spindle rpm.

Several different types of tool break can occur in machining operations, and each type produces a characteristic acoustic signature. Although a given set of machining conditions can produce any of several types of tool breaks, there is considerable correlation between machining conditions and the dominant type of tool break that results. Thus, prior knowledge of machining conditions for a cut permits optimization of tool break detection parameters, and even choice of an optimum break detection algorithm, before the cut begins. It is desirable to utilize information in the machine tool control to achieve this optimization.

The following commonly assigned copending applications, all C. E. Thomas et al, are cross-referenced, the first on tool touch detection and the second, third and fourth on tool break detection: U.S. Ser. Nos. 645,203 filed Aug. 29, 1984; 664,188 filed Oct. 24, 1984; 664,189 filed Oct. 24, 1984; 685,005 now U.S. Pat. Nos. 4,631,683; 4,636,780; 4,636,799; and 4,642,617 Dec. 21, 1984;

SUMMARY OF THE INVENTION

An object of the invention is to utilize information on each cut contained in a parts program to optimize the Machine Tool Monitor parameters for the machining conditions to be expected on each individual cut.

Another object is the use of parts program information to determine the gain of the detector and select and set parameters controlling the tool break detection logic and optimize them for the cutting conditions specified by the machine tool control.

Yet another object is the provision of automatic selection of the tool break or the tool touch detection mode of operation by means of information from the numerical machine tool control.

The improved monitor is comprised of a vibration sensor to generate a signal corresponding to vibrations at the cutting tool/workpiece interface, and an analog signal processing channel having a gain control and means to filter the vibration signal to attenuate lower frequency machinery noise and detect the signal energy in a restricted acoustic frequency band below 100 KHz. A digital subsystem includes means for sampling and converting analog samples of the analog channel output to digital values, and signal pattern recognition logic to test for characteristic major tool break and tool touch acoustic signatures and generate alarm signals which can be sent to the machine tool control. Means are provided for adjusting the analog channel gain control to optimize operation of the monitor for varying machining conditions based on machine tool control information which is communicated to the monitor. In one embodiment this information is machining parameters such as surface speed, depth of cut, feed rate, and workpiece and tool description. Gain values are computed from these machining parameters and utilized to adjust the gain control. In an alternative embodiment the machine tool control information transferred to the monitor is precalculated gain values which are derived from these machining parameters and are routed to the gain control. A touch/break mode select signal from the machine tool control determines the mode of operation.

Another feature of the improved tool break detection system and method is that part program information on machining parameters, such as spindle rpm, finish-/rough cut designation and tool description, is used to select and set parameters controlling the tool break detection logic, optimizing the monitor for the cutting conditions called for by the numerical control. Alternatively, logic parameters are communicated to the monitor from the machine tool control and routed to the pattern recognition logic.

DETAILED DESCRIPTION OF THE INVENTION

The functions of the Machine Tool Monitor, to detect major tool breakage that may damage the workpiece or tool and to detect light rubbing contact of an advancing tool with a rotating workpiece, can be carried out without any communication from the Machine Tool Control. However, such communication can enhance the performance of the Machine Tool Monitor and extend the range of applications for which it can be used. First, information from the machine tool control can automatically select the tool break or tool touch detection mode of operation so that even in unmanned operations each cut in the part program of cuts to be made on a workpiece can be monitored for tool break events, and tool touch detection can be used for gauging parts or new tools between cuts. Second, the Machine Tool Monitor can supply tool break or tool touch event information directly to the machine tool control, which can be programmed to make the proper response to the detected event without human intervention. Third, information from the part program in the machine tool control may be used to optimize the Machine Tool Monitor parameters for the machining conditions to be expected on each individual cut.

Figure 1:
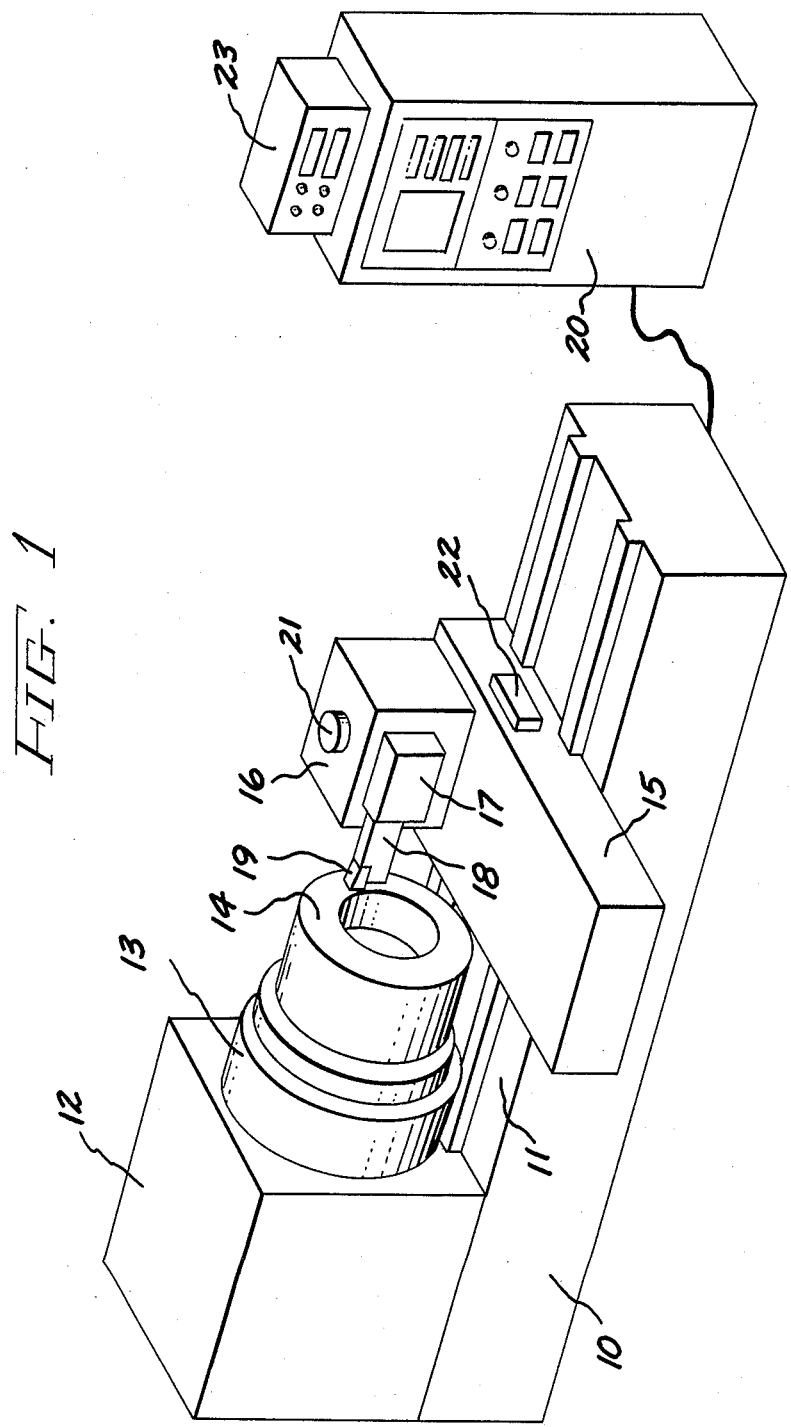
FIG. 1 is a schematic perspective view of a horizontal turret lathe equipped with a Machine Tool Monitor to detect tool breakage and tool touch to the workpiece.

FIG. 1 shows a horizontal turret lathe on which is installed an improved Machine Tool Monitor. The monitor has applicability to vertical turret lathes and other types of machine tools such as milling machines, machining centers, and drills. The illustrated lathe components are the machine frame 10, Z slide 11, headstock 12, chuck 13, workpiece 14, and X cross slide 15. A rotatable tool turret 16 has several tool blocks 17 (only one is shown) each supporting a tool holder 18 and cutting insert 19. The machine tool control 20 is also called a numerical control or computerized numerical control. The major components of the Machine Tool Monitor are: a vibration sensor 21 such as a broadband accelerometer mounted on the lathe turret or turret base in a location with good coupling to vibrations generated at the tool/workpiece interface; an analog preprocessor 22 preferably located on the lathe near the turret to minimize electronic noise pickup; and a remotely located digital processor 23.

The Machine Tool Monitor uses a single sensor that is small and rugged and may be mounted a reasonable distance from the tool/workpiece interface. One suitable vibration sensor is the Vibrametric VM1000 accelerometer Vibra-Metrics, Inc., Hamden, CT), used in a region of relatively flat response below its resonant frequency. It is usually located on the rotatable turret and a miniature slip ring and coaxial wire connect it to the analog preprocessor. An alternative location, which depends upon the lathe design, is off the turret where no rotating coupler is required. It has been established in the previously mentioned copending applications that the tool touch and tool break detector utilizes acoustic vibrations in the 30 to 100 KHz region; there is a need to attenuate high amplitude machinery noise which tends to be concentrated at lower frequencies, and vibrations above 100 KHz are strongly attenuated if the sensor is not on the tool holder.

Figure 2:
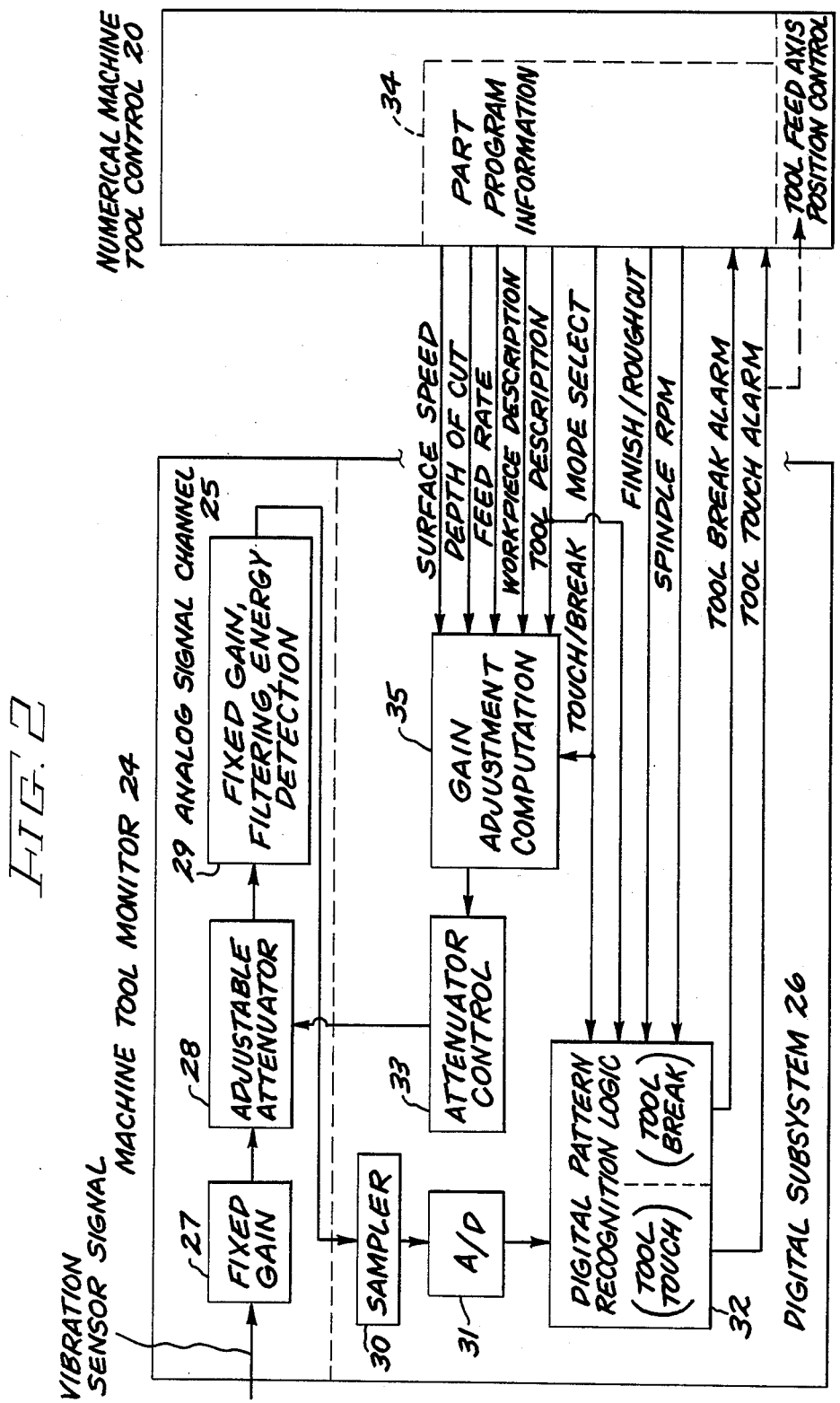
FIG. 2 shows a system for optimizing Machine Tool Monitor parameters based upon part program information.

One embodiment of the invention is illustrated in FIG. 2, which shows the Machine Tool Monitor 24 on the left, the numerical machine tool control 20 (such as General Electric's MC2000) on the right, and the communication lines between these two devices The Machine Tool Monitor has an analog signal channel 25 and a digital subsystem 26. The analog signal channel 25 processes the raw vibration signal output of the vibration sensor and produces an output signal amplitude versus time waveform proportional to the energy in a restricted band of the raw vibration signal. In order to provide a means for keeping the vibration signal level in the preferred operating range, the analog signal channel includes a gain control capable of changing the gain of the channel over a large range under the control of the digital subsystem. As shown in the figure, the sensor has associated with it a fixed gain 27. The amplified sensor signal is presented to an adjustable attenuator or gain control 28 to keep signals within the dynamic range of the system. Thereafter the analog signal is passed to filtering and energy detection circuitry 29 (there is a fixed gain associated with the filtering). If the VM1000 accelerometer is the sensor, the analog signal processing channel can include a bandpass filter to restrict the signal to a 35 KHz to 60 KHz region, and the energy detector is comprised of a full wave rectifier and a 500 Hz low pass anti-aliasing filter to produce the signal energy versus time analog waveform. Other accelerometers and analog signal processing arrangements are described in the cross-referenced copending applications.

The digital subsystem 26 has a sampler 30 and analog-to-digital converter 31 to sample the analog channel output and convert analog samples to digital format. It has digital pattern recognition logic 32 to detect signal patterns associated with tool break events when operating in the tool break detection mode, or patterns associated with tool touch events when operating in the tool touch detection mode. It tests for characteristic acoustic signatures associated with these events. Inherent in this function is the rejection of other signal patterns not associated with the events to be detected, even though such patterns may share some common features with those that are associated with events to be detected. Thus, there is a fundamental problem of obtaining adequate sensitivity to the patterns associated with events to be detected, without producing too many false alarms on other similar signal patterns.

Another fundamental problem with vibration monitoring systems is the large dynamic range of possible signal amplitudes with which such systems must deal, and the limits on the dynamic range of electronic systems. In the case of the Machine Tool Monitor, there is the added factor that the performance of the tool break detection logic, in terms of probability of detection and probability of false alarm, is best if the mean vibration signal level under metal cutting conditions prior to the tool break event is approximately 20 dB below the upper limit of the dynamic range of the electronics Performance tends to deteriorate for either much higher, or much lower, signal levels. Thus, to keep the vibration signal level in the preferred operating region, analog signal channel 25 has a gain control comprised of adjustable attenuator 28 and attenuator control 33, capable of changing the gain of the channel over the range of 60 dB under the control of digital subsystem 26. A specific gain control is a multiplying digital-to-analog converter plus a counter; the attenuation control word is read out of the counter in parallel and determines the MDAC attenuation.

The signal level received from vibration sensor 21, and hence the optimum setting of the analog channel gain, depends upon a combination of factors including the sensitivity of the sensor, the propagation loss between the vibration source (near the tool/workpiece interface) and the sensor, the type of tool, the workpiece material, the workpiece or tool surface speed, the depth of cut, and the tool feed rate. Even with a specific sensor mounted in a specific location relative to the vibration signal source, the remaining factors can cause the signal to vary over a range of more than 40 dB in conventional machining operations. Consequently, it may be necessary to adjust the analog channel gain when major changes in any of the other listed machining operation factors are made.

In FIG. 2, the part program is indicated at 34 and part program information that resides in the machine tool control is shown. The part program is a software program which directs the computer in the machine tool control, which, in turn, controls the spindle and tool feed drives to obtain the desired depth of cut, surface speed and feed rate, and controls selection of the tool with which the machining is accomplished. The part program also controls part gauging and tool offset measuring cycles in addition to the cutting operations. Consequently, the information which determines the best setting of the gain of analog signal channel 25 can reside (and most of it must reside) in the part program 34 in machine tool control 20. This machining parameter information is communicated to Machine Tool Monitor 24, which uses it to compute the best setting of the analog channel gain.

Figure 3:
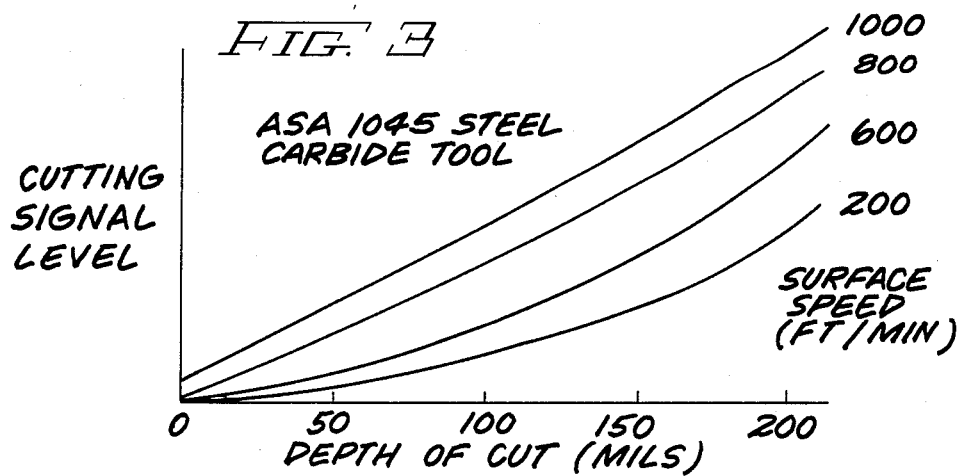
FIG. 3 is a graph of cutting signal level versus depth of cut and surface speed.

The quantitative effects of the various machining parameters on the vibration signal level are known from extensive laboratory experiments that produced data such as that shown in FIG. 3. The effect of depth of cut and surface speed on cutting signal level is depicted for one combination of tool type, workpiece material and feed rate. Experiments have shown that such information permits computation of the optimum gain of analog signal channel 25 within a few dB before each cut in the part program begins.

Digital subsystem 26, FIG. 2, according to this embodiment includes gain adjustment computation means 35 to which the following machining parameters are transferred from part program 34: surface speed, depth of cut, feed rate, and workpiece and tool description. The calculated gain value at each cut, determined by either a table lookup procedure or solution of a simple mathematical formula, is sent to the gain control. A select signal is presented to attenuator control 33 which in turn determines the setting of adjustable attenuator 28. The digital circuitry in the digital processor is typically in the form of a programmable general purpose computer.

In the tool touch detection mode the vibration signal is generated by a light rubbing contact of the tool and workpiece as one or the other rotates. This is in contrast with the cutting operation in the tool break detection mode. Therefore, the vibration signal level sensed in the tool touch detection mode is lower than in the tool break detection mode and higher analog channel gain is required. Thus, the selection by the machine tool control part program of the Machine Tool Monitor operating mode also affects the selection of analog channel gain. A touch/break mode select signal is transferred from part program 34 to gain adjustment computation means 35 and pattern recognition logic 32.

Figure 4:
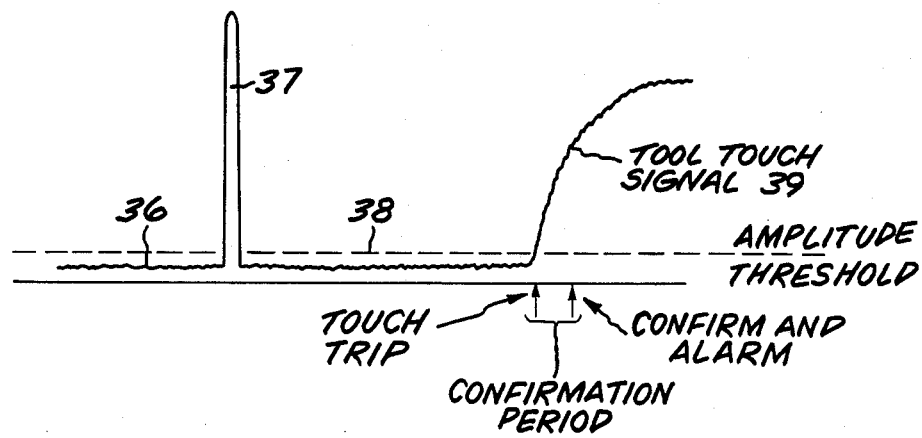
FIG. 4 shows a tool touch vibration signature and a noise spike that is dismissed.

FIG. 4 illustrates the unipolar signal at the output of analog preprocessor 22 and one method of tool touch detection by the trip and confirm technique. The low continuous traverse noise signal 36 is produced with no tool/workpiece contact as the tool slowly advances toward the workpiece. A high amplitude noise spike 37 rises above an amplitude threshold 38 but is of short duration and is dismissed as a false alarm. Some lathes and machine tools have pre-touch vibration signals that do not exhibit such noise spikes. A valid gradually rising tool touch signal 39 crosses the amplitude detection threshold 38 and trips the detector. During the confirmation period the recognition logic continuously checks for signal samples above the amplitude threshold, and a tool touch alarm is generated when a preset number of above-threshold samples are counted before the confirmation period ends. Alternately, below-threshold samples may be used and the detection logic is inverted. Digital pattern recognition logic 32, FIG. 2, has a dual path and the mode select signal selects the tool touch logic.

The pattern recognition logic in the Machine Tool Monitor can be adjusted by selection of sets of parameters, hereafter called logic parameters, to optimize performance for changing machining conditions. The tool break detection logic can be optimized for different cutting conditions by selection of values for, for instance, 24 parameters. Extensive testing has shown that significant tool break events capable of damaging the workpiece or tool, or force a re-cut, can be detected, and normal cutting noise artifacts can be ignored, by proper selection of the parameters that determine: the allowable rates of signal level change; the allowable percentage changes in signal level relative to a pre-event average signal level; and the persistence times of these levels shifts before a tool break alarm is generated. Moreover, there are some time window parameters in the tool break detection logic whose optimum values are related to the period of a revolution of the machine tool spindle This is because it may be necessary to examine the signal pattern over a full revolution to discriminate between isolated tool break event signal patterns and normal cutting event signal patterns that repeat one or more times per revolution. This problem is most likely to occur when the workpiece surface is rough or contains a previously machined hole or slot. Consequently, as seen in FIG. 2, the part program 34 also sends to Machine Tool Monitor 24 information on the workpiece surface, i.e. finish/rough cut information, and on machine tool spindle rpm.

Figure 5:
FIGS. 5-7 illustrate three common types of tool break acoustic signatures.
Figure 6:

Under most machining conditions significant tool break events produce substantial, abrupt, sustained shifts in the level of the vibration signal. FIGS. 5 and 6 illustrate two common types of tool break acoustic signatures, respectively exhibiting an abrupt, substantial, persistent level decrease and increase. Detection of these level shifts is the principle function of the tool break detection logic, which forms the other part of pattern recognition logic 32, FIG. 2. The analysis of the digitized signal samples is in two basic phases. Each new signal sample is compared with a running mean signal level. In the first phase, an abrupt, large transient increase or decrease in the vibration signal level is detected, and the second phase is a test for persistence of the mean for a given confirmation period outside of threshold limits which are user-selectable. The presence of an abrupt and persistent increase or decrease in vibration signal may indicate an abrupt change in cutting noise resulting from a change in cutting conditions, and may have its source in a significant tool break event.

Figure 7:
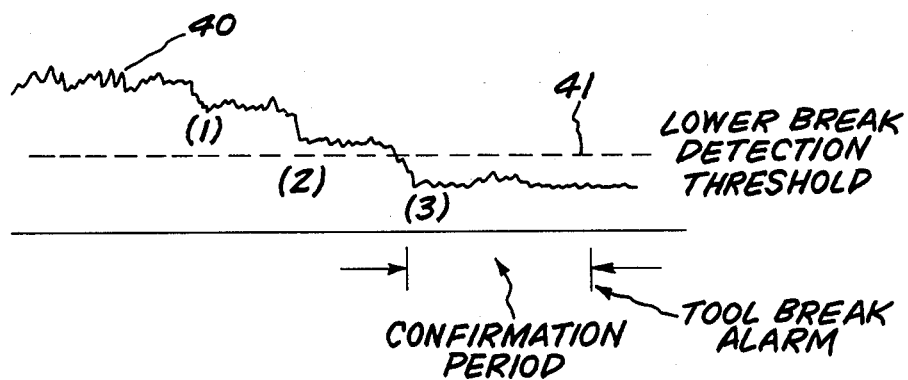

However, under some machining conditions the substantial signal level shift may occur more gradually, producing a tool break acoustic signature more difficult to distinguish from normal cutting noise signal artifacts. Referring to FIG. 7, the signal level of processesed analog vibration signal 40 drops abruptly at (1), (2) and (3), each drop being associated with a small tool break event. Each signal level change is too small to meet the abrupt signal change break detection criterion, but the total effect is significant. When the mean signal level value drops below a preset lower break detection threshold 41, the tool break detector starts counting signal samples. If the mean signal level remains below the threshold for a minimum confirmation period, a tool break alarm is generated. The tool break detection logic can be adjusted to detect these less common tool break event signal patterns, but at the cost of some increase in false alarm rate. The probability of these gradual level change tool break patterns occurring is greater under some machining conditions than others. This type of pattern tends to be associated with certain kinds of tools and workpiece conditions. Therefore, as seen in FIG. 2, part program 34 supplies information on these factors to digital pattern recognition logic 32, which uses it to adjust its logic parameters to either detect or ignore these patterns depending upon the probability of their occurrence. Other types of tool break signatures are discussed in the copending applications.

Figure 8:
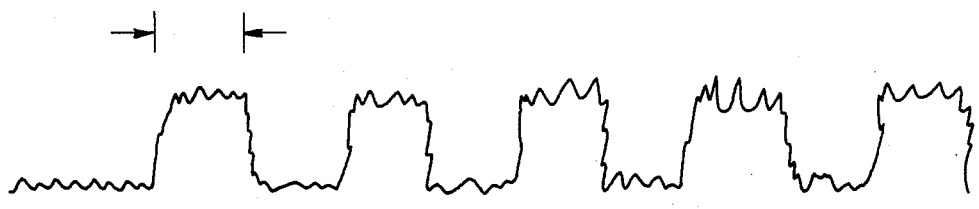
FIG. 8 illustrates a normal vibration signal from intermittent cutting on a rough surface which does not trigger a tool break alarm.

One common normal cutting signal artifact that the break detection logic ignores is shown in FIG. 8. This signal is produced during rough surface cutting, characterized by alternate metal-cutting and air-cutting. The abrupt and substantial level shift test is satisfied, but the persistent mean shift confirmation period test is not met because the level change durations (between the arrows) are shorter than a workpiece revolution. Signal level shifts are rejected that do not persist at least one full revolution. Another normal cutting signal pattern that does not trigger a broken tool alarm is a start-of-cut transient because the rate of signal increase is too slow. A third is chip dynamics noise resulting in a series of high amplitude noise spikes (as in FIG. 4) because there is no sustained substantial signal level shift. These processed analog vibration signals do not pass the preestablished tests for characteristic tool break acoustic signatures.

FIG. 2 also shows that the Machine Tool Monitor 24 supplies to the machine tool control part program 34 the tool break and tool touch alarm signals at the time when these events occur. The numerical tool control 20 uses these alarms to initiate special tool position control sequences appropriate to the events detected. With some machine tool controls the response of the control to a tool touch event is not sufficiently rapid to avoid marring of the workpiece by the tool cutting edge. In this case it is necessary, as indicated in the figure, to communicate the tool touch alarm directly to the tool feed axis position control as well as to the part program.

Figure 9:
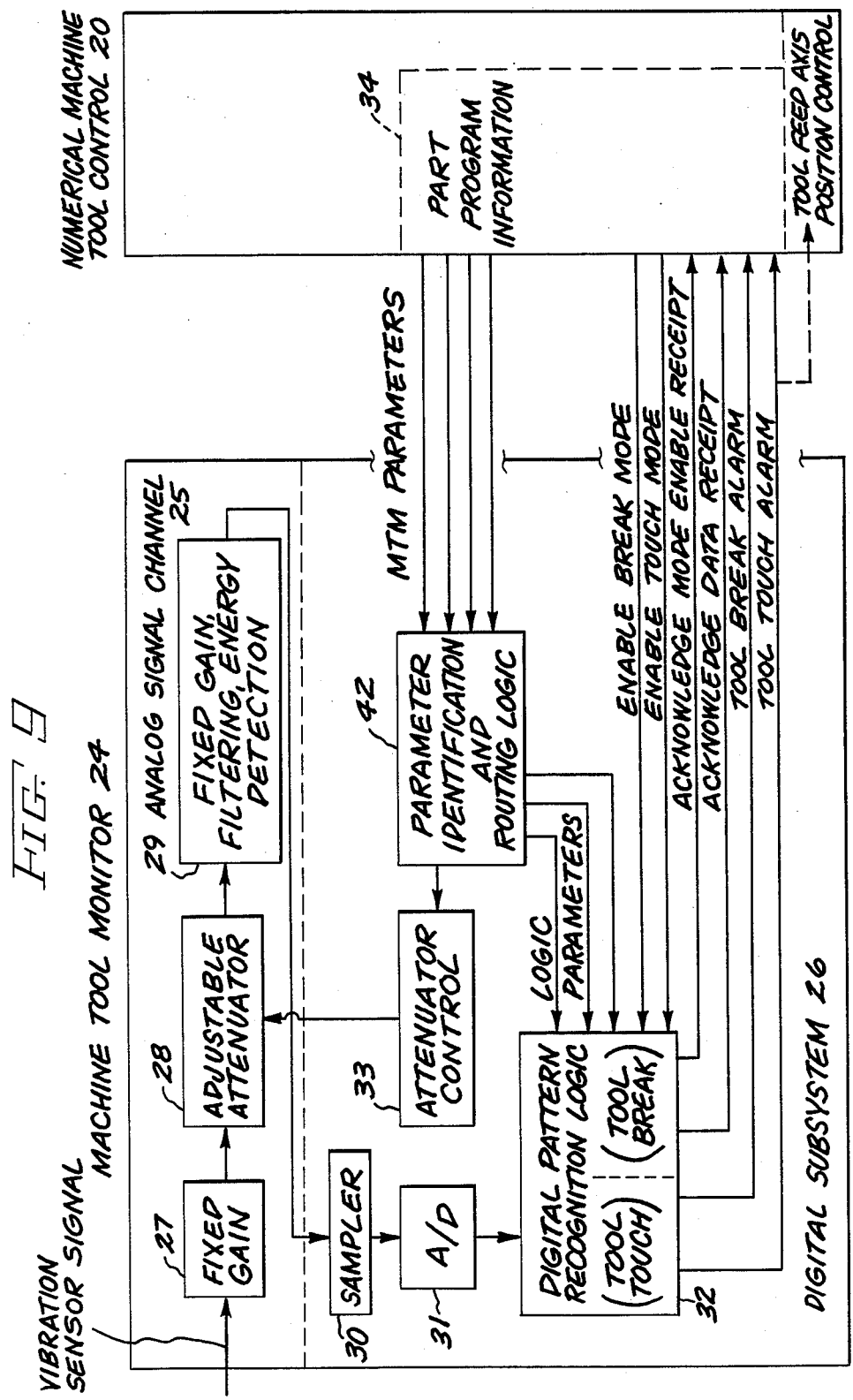
FIG. 9 is a system diagram of another embodiment of the invention to optimize Machine Tool Monitor parameters.

An alternate communication arrangement using the same basic ideas is shown in FIG. 9. In this arrangement, all tool break and tool touch detector parameters are sent from part program 34 to Machine Tool Monitor 24 over the same set of communication lines. This includes the gain control word or precalculated analog channel digital gain values, which are determined in machine tool control 20 (as by an APT macro program) rather than in Machine Tool Monitor 24. The MTM parameters are transferred from part program 34 to parameter identification and routing logic 42 in digital subsystem 26. The gain control word is routed to attenuator control 33 and determines the signal attenuation factor adjustable attenuator 28 applies to the signal channel, and thus sets total channel gain. The logic parameters are routed to pattern recognition logic 32; these paramenters are, for instance, finish/rough cut information, gain and machine tool spindle rpm, from which the pattern recognition logic will make the appropriate internal parameter settings.

FIG. 9 shows additional communication lines used for handshaking arrangements that check that signals sent are actually received. These are Enable Break Mode and Enable Touch Mode signals, and Acknowledge Mode Enable Receipt and Acknowledge Data Receipt signals. As before, break alarm and touch alarm signals are supplied to machine tool control 20, and the latter to the tool feed axis position control to speed up retraction of the tool.

In conclusion, the use of part program information on machining parameters to compute and set the gain of the tool break and tool touch detector optimizes it for the cutting conditions called for by the machine tool control. Moreover, part program information on machining parameters is used to select and set parameters controlling the tool break detection logic, optimizing it for the cutting conditions called for by the machine tool control. The desired operating mode, tool break detection or tool touch detection, is selected by the machine tool control While the invention has been particularly shown and described with reference to preferred embodiments, it would be understood by those skilled in the art that the foregoing and other changes in form and details may be made therein without departing from the spirit and scope of the invention.

What is claimed is:

1. A method of optimizing the performance of a monitor installed on a machine tool which is controlled by a machine tool control having a part program, comprising the steps of:

sensing vibrations resulting from interaction of a cutting tool with a workpiece and from other machine tool noise sources and generating a vibration signal;

preprocessing said signal in an analog channel which has an adjustable gain, attenuates lower frequency machinery noise, and generates an analog waveform representative of the amplitude of vibrations in a chosen band below 100 KHz;

analyzing samples of said analog waveform in a digital processor to detect, by means of pattern recognition logic, signal patterns characteristic of significant tool breakage and light rubbing contact of said tool and workpiece, and generating tool break and tool touch alarms which are sent to said machine tool control; and adjusting the gain of said analog channel using part program information on machining parameters including workpiece surface speed, feed rate, depth of cut, and workpiece and tool description to optimize operation of said monitor for the cutting conditions called for by said machine tool control.

2. The method of claim 1 further including the step of using said part program information on machining parameters including finish/rough cut description and spindle revolutions per minute, to determine logic parameters controlling break detection logic which is part of said pattern recognition logic.

3. The method of claim 2 further including the step of selecting the tool break or tool touch mode of operation of said monitor from information in said part program.

* * * * *